US012516799B2

(12) United States Patent
Yan et al.

(10) Patent No.: US 12,516,799 B2
(45) Date of Patent: Jan. 6, 2026

(54) LIGHT STAND

(71) Applicant: TILTA INC., Burbank, CA (US)

(72) Inventors: Yaxiong Yan, Shenzhen (CN); Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/795,868

(22) Filed: Aug. 6, 2024

(65) Prior Publication Data

US 2025/0320990 A1 Oct. 16, 2025

(51) Int. Cl.

*F21V 21/15* (2006.01)
*F21V 21/116* (2006.01)
*F21V 21/30* (2006.01)
*F21W 131/406* (2006.01)

(52) U.S. Cl.

CPC ............ *F21V 21/15* (2013.01); *F21V 21/116* (2013.01); *F21V 21/30* (2013.01); *F21W 2131/406* (2013.01)

(58) Field of Classification Search

CPC .......................... F21V 21/30; F21W 2131/406
See application file for complete search history.

(56) References Cited

U.S. PATENT DOCUMENTS 5,590,955 A * 1/1997 Bornhorst ............... F21V 17/02 362/232
5,957,562 A * 9/1999 Hill ......................... F21V 21/22 362/253
2004/0070984 A1* 4/2004 Smith ..................... F21V 21/15 362/427
2005/0047142 A1* 3/2005 Lui ........................ B60Q 1/245 362/286
2012/0307486 A1* 12/2012 Gordin .................... F21V 21/30 362/249.11
2013/0010471 A1* 1/2013 Dalsgaard ............... F21V 17/16 29/428

FOREIGN PATENT DOCUMENTS

CN 209042065 U * 6/2019
CN 217356756 U 9/2022
CN 220688941 U 3/2024

OTHER PUBLICATIONS

Machine translation of CN-209042065-U, to "Dai et al.", published Jun. 28, 2019 (Year: 2019).*

* cited by examiner

*Primary Examiner* — William N Harris
(74) *Attorney, Agent, or Firm* — LOZA & LOZA, LLP; Derek Yeung

(57) ABSTRACT

This present disclosure pertains to the domain of lighting fixtures, particularly a light stand. The light stand includes a light stand base furnished with a first driving mechanism, as well as a support frame designed for the installation of a light source component. The output terminal of the first driving mechanism is linked to the underside of the support frame, facilitating its ability to rotate the support frame relative to the light stand base, and thus rotate the light source component. By integrating the first driving mechanism into the light stand base and connecting its output terminal to the bottom of the support frame, the mechanism effectively rotates the support frame, subsequently rotating the light source. This design fulfills the objective of automatically adjusting the light source component's position.

9 Claims, 9 Drawing Sheets

LIGHT STAND

CROSS-REFERENCE TO RELATED APPLICATIONS

The present application for patent claims priority to and the benefit of pending Chinese Application No. 202420770728.1, filed Apr. 12, 2024, and hereby expressly incorporated by reference herein as if fully set forth below in its entirety and for all applicable purposes.

TECHNICAL FIELD

The present disclosure relates to the field of lighting fixtures, specifically to a light stand.

INTRODUCTION

In photography, staging, and various other scenarios, it is often necessary to install lights to augment illumination in diverse areas. A significant number of lamps utilized in these settings require the capability to adjust their pitch angle and illumination direction based on the specific situation. Additionally, it is frequently necessary to change lamps with matching parameters according to on-site conditions. Consequently, a light stand with a dual-support structure is commonly employed as a fixture for the light source. Since the light source is affixed between two supports, light sources often need to adjust their illumination angle and position on the lamp stand. Currently, manual adjustment is commonly used when adjusting the position of the light source on the light stand, which results in slow adjustment and poor timeliness.

BRIEF SUMMARY

This application discloses a light stand comprising a support frame equipped with a driving mechanism. The light source, movably connected to the support frame, can automatically adjust its position via the driving mechanism, thereby addressing the issue of manual adjustment of light source position on existing light stands.

The light stand comprises: a light stand base equipped with a first driving mechanism; and a support frame for mounting a light source component. The output end of the first driving mechanism is connected to the bottom of the support frame, enabling the first driving mechanism to drive the support frame to rotate relative to the light stand base, thereby rotating the light source component.

In some aspects, the first driving mechanism comprises a first driving motor, a first transmission part, and a first rotating shaft; the first driving motor is fixedly mounted on the light stand base and connected to the first rotating shaft through the first transmission part; and an output end of the first rotating shaft is connected to the support frame for driving the support frame to rotate.

In some aspects, the light stand base comprises a control box, and the support frame comprises an installation base; the installation base has a first limiting guide rail on a side facing the control box, while the control box is equipped with a first limiting post that fits into the first limiting guide rail; and the first driving mechanism is installed in the control box with an output end connected to the installation base to drive the installation base to rotate relative to the control box.

In some aspects, the light stand further comprises a second driving mechanism; one end of the support frame away from the light stand base comprises an installation portion for mounting the light source component; and the second driving mechanism is mounted on the installation portion to drive the light source component to rotate relative to the installation portion.

In some aspects, the support frame comprises a first support frame and a second support frame connected to each other; an output end of the first driving mechanism is connected to a junction between the first support frame and the second support frame; the first support frame and the second support frame each comprise an installation portion for mounting the light source component at respective ends of the first support frame and the second support frame away from the light stand base; and the second driving mechanism is mounted on the installation portion of the first support frame to drive the light source component to rotate relative to the installation portions of both the first support frame and the second support frame.

In some aspects, the installation portion is movably provided with a rotating base for mounting the light source component; and an output end of the second driving mechanism is connected to the rotating base to drive the rotating base to rotate relative to the support frame.

In some aspects, the second driving mechanism comprises a second driving motor, a second transmission part, and a second rotating shaft; the second driving motor is fixedly mounted on the installation portion and connected to the second rotating shaft through the second transmission part; and an output end of the second rotating shaft is connected to the rotating base to drive the light source component to rotate relative to the installation portion.

In some aspects, the rotating base comprises a quick-release assembly and a first locking component; the rotating base further comprises a first mounting groove on a side facing away from the support frame; and a first side of the quick-release assembly is mounted on the first mounting groove and locked by the first locking component, and a second side is configured for mounting the light source component.

In some aspects, the quick-release assembly comprises a quick-release piece, a second locking component, and an installation block; the quick-release piece comprises a quick-mounting plate on a first side for mounting in the first mounting groove and a second mounting groove on a second side; and a first side of the installation block is mounted on the second mounting groove and locked by the second locking component, and a second side is configured for mounting the light source component.

In some aspects, the rotating base comprises a second limiting post, and the support frame comprises a second limiting guide rail; and the second limiting guide rail and the second limiting post cooperate to limit a rotation of the support frame.

This utility model pertains to the domain of lighting fixtures, particularly a light stand. The light stand includes a light stand base furnished with a first driving mechanism, as well as a support frame designed for the installation of a light source component. The output terminal of the first driving mechanism is linked to the underside of the support frame, facilitating its ability to rotate the support frame relative to the light stand base, and thus rotate the light source component. By integrating the first driving mechanism into the light stand base and connecting its output terminal to the bottom of the support frame, the mechanism effectively rotates the support frame, subsequently rotating the light source. This design fulfills the objective of automatically adjusting the light source component's position.

Figure 1:
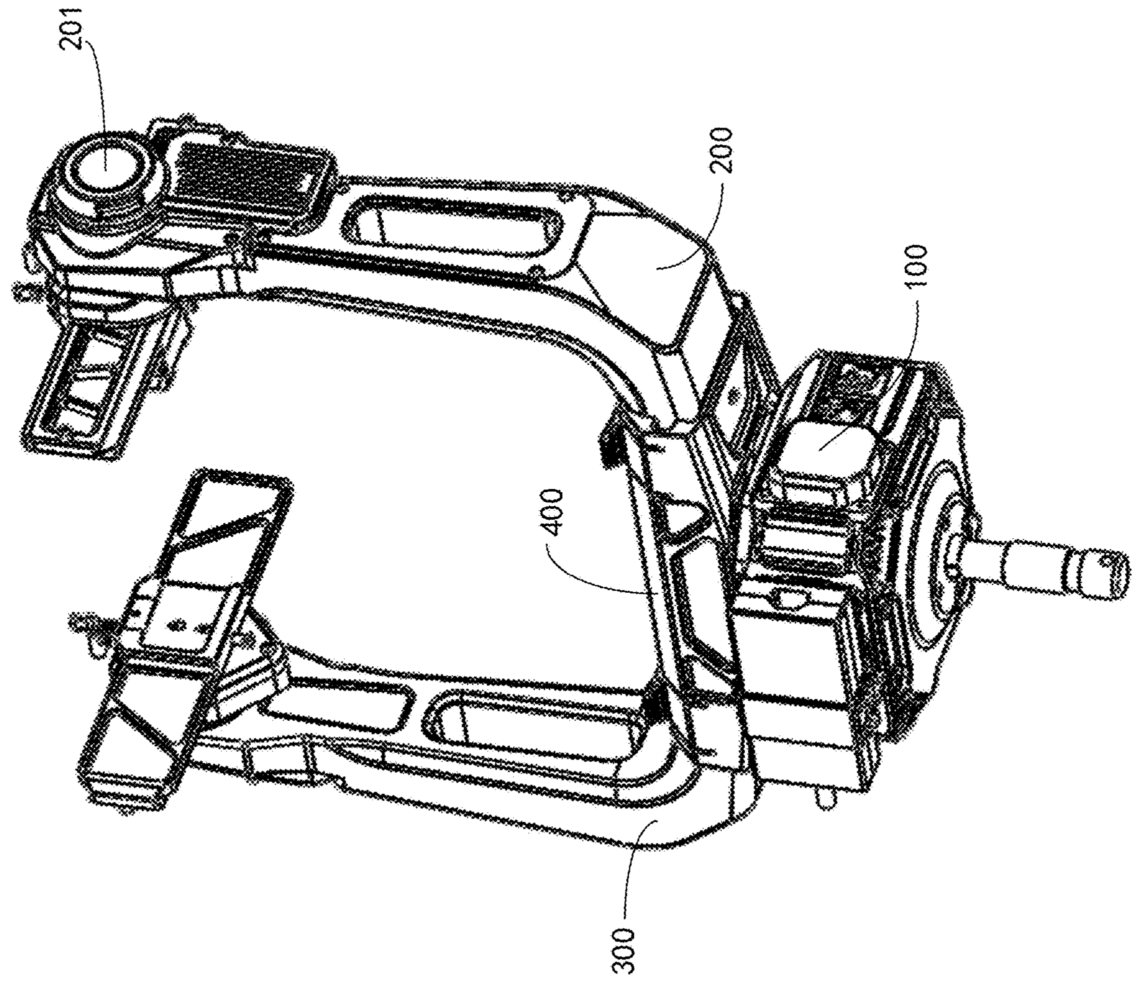
FIG. 1 is a diagram of a light stand according to some aspects of the disclosure.

The reference numerals in the drawings are as follows:

100—light stand base, 101—first driving mechanism, 200—first support frame, 300—second support frame, 102—first driving motor, 103—first transmission part, 104—first rotating shaft, 105—control box, 400—installation base, 401—first limiting guide rail, 106—first limiting post, 201—installation portion, 202—second driving mechanism, 203—second driving motor, 204—second limiting guide rail, 205—second transmission part, 206—second rotating shaft, 500—rotating base, 501—first mounting groove, 502—first locking component, 503—second limiting post, 600—quick-release component, 601—quick-release piece, 602—second locking component, 603—installation block, 604—second mounting groove.

DETAILED DESCRIPTION

Herein, a further elaboration of this utility model is provided through concrete embodiments accompanied by the attached figures. Similar components across different embodiments are labeled consistently. While numerous details are provided to facilitate comprehension, experts in the field will readily recognize that certain features may be omitted in specific situations or substituted with alternative components, materials, or methods. In some instances, certain operations related to this application are omitted from the specification to avoid overwhelming the core aspects with excessive descriptions. For those skilled in the art, a detailed description of these related operations is not necessary as they can fully comprehend the operations based on the provided specifications and general technical knowledge in this domain.

Furthermore, the characteristics, operations, or features described herein can be combined in various suitable ways to yield diverse embodiments. Similarly, the steps or actions outlined in the methods can be sequenced or adjusted in manners evident to those skilled in the art. Therefore, the sequences depicted in the specification and figures are solely meant to clarify a particular embodiment and do not indicate a necessary order, unless specified otherwise.

The numbering used for components, such as "First" and "Second," serves solely to distinguish between described objects and does not convey any sequential or technical significance. Unless otherwise specified, the terms "connection" and "linkage" encompass both direct and indirect connections (linkages).

In some aspects, a light stand includes a light stand base 100 equipped with a first driving mechanism 101, and a support frame designed for mounting a light source. The output end of the first driving mechanism 101 is connected to the underside of the support frame, enabling the mechanism to rotate the support frame relative to the light stand base 100, thereby adjusting the direction of the light source.

Figure 2:
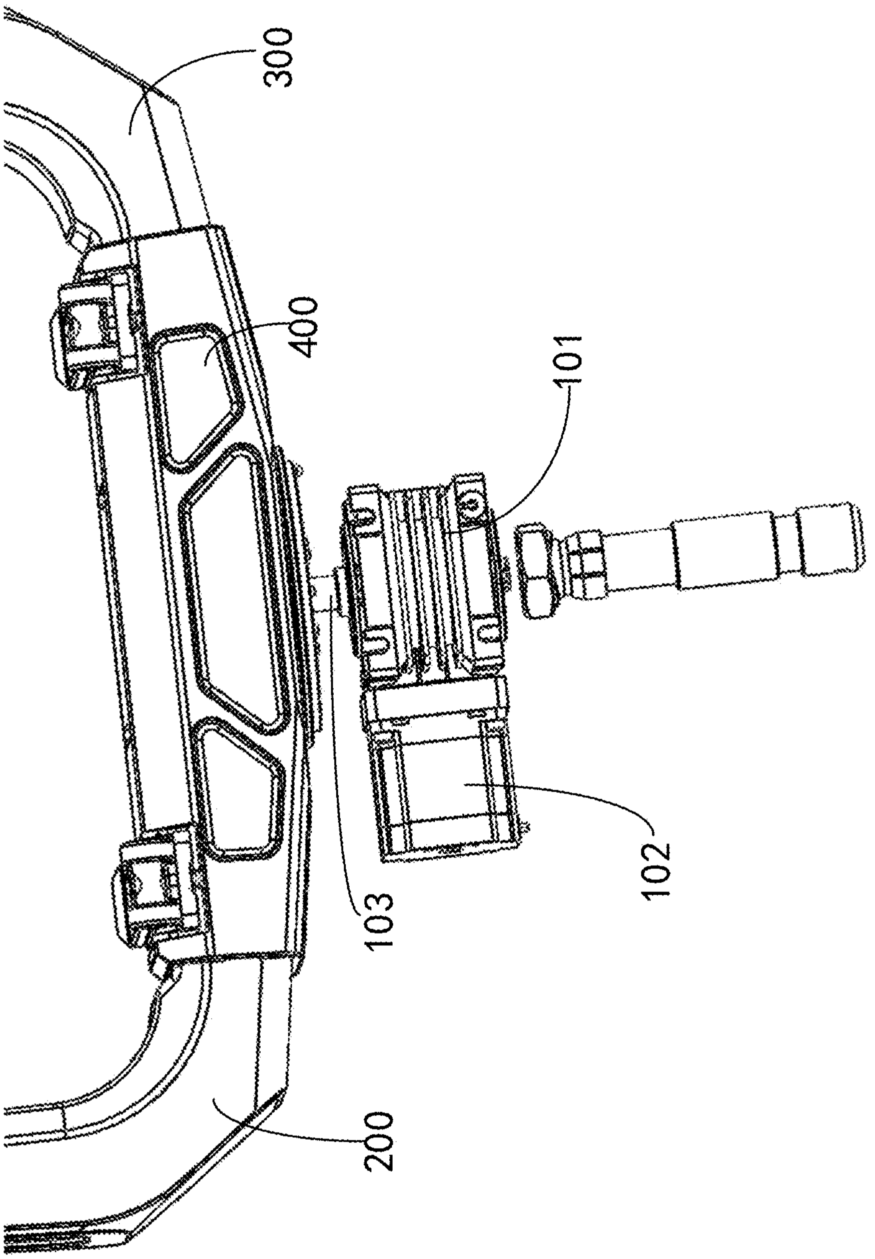
FIG. 2 is a diagram depicting a portion of the light stand of FIG. 1 with a shell of the light stand base removed.

Referring to FIGS. 1 and 2, FIG. 1 depicts a light stand, and FIG. 2 illustrates a partial view of the light stand with the shell of the light stand base 100 removed. The light stand includes a light stand base 100 equipped with a first driving mechanism 101. The support frame, depicted in FIG. 1, includes a first support frame 200 and a second support frame 300, designed for mounting the light source. In alternative embodiments, the support frame can adopt different structures, such as being composed of a single support frame or three support frames. The output end of the first driving mechanism 101 connects to the bottom of the support frame via an output shaft, as shown in FIG. 2. Through this output shaft, the first driving mechanism 101 can rotate the support frame relative to the light stand base 100, adjusting the light source's illumination direction.

In some aspects, the first driving mechanism 101 includes a first driving motor 102, a first transmission part 103, and a first rotating shaft 104. The first driving motor 102 is fixedly mounted on the light stand base 100 and connected to the first rotating shaft 104 through the first transmission part 103. An output end of the first rotating shaft 104 is connected to the support frame for driving the support frame to rotate.

Figure 3:
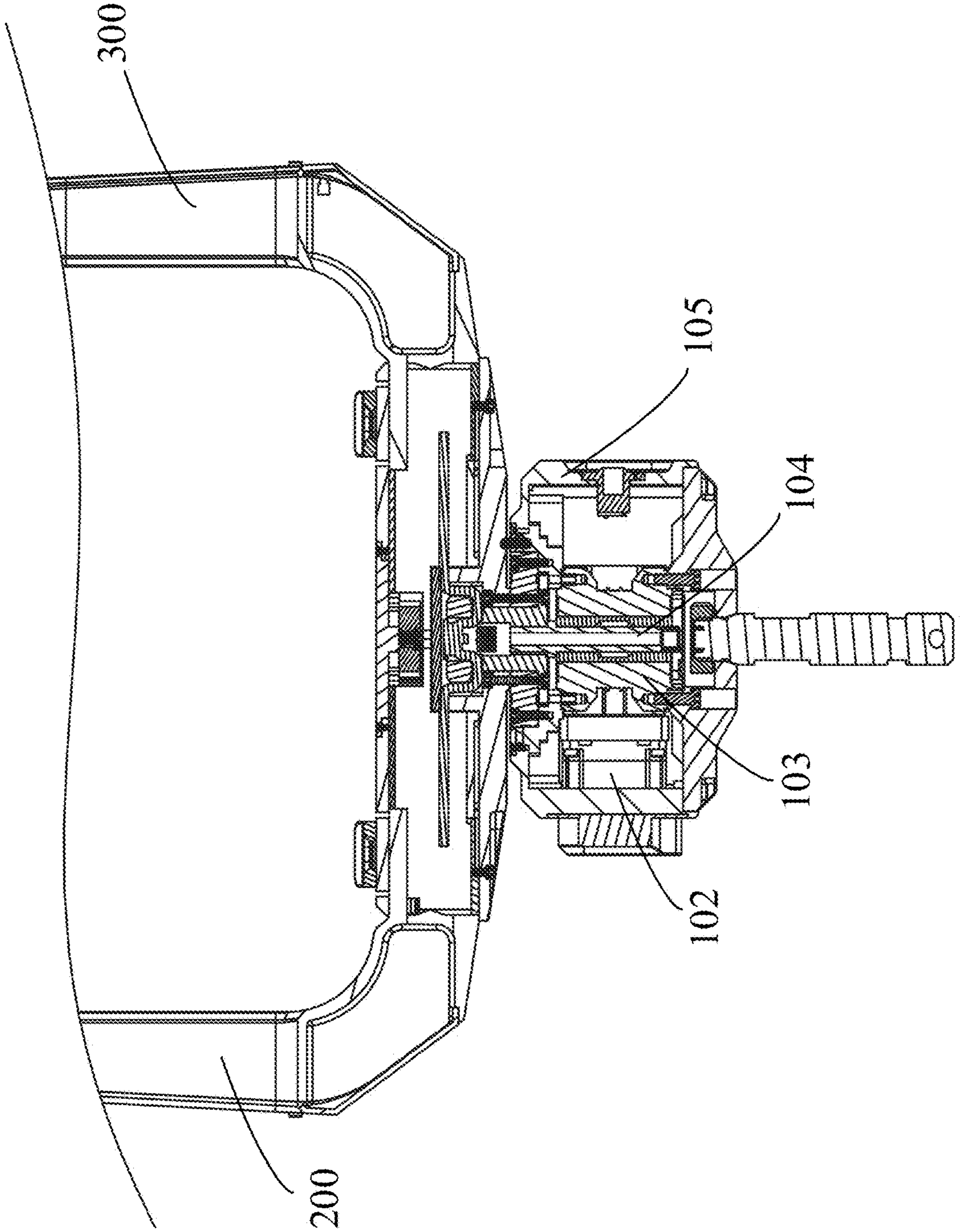
FIG. 3 is a sectional view of the light stand according to some aspects of the disclosure.

Referring to FIGS. 1-3, FIG. 3 illustrates the coupling structure between the first transmission part 103 and the first rotating shaft 104 of the light stand according to some aspects of the disclosure. The first driving mechanism 101 includes a first driving motor 102, a first transmission part 103, and a first rotating shaft 104. The first driving motor 102 is fixedly mounted on the light stand base 100 and connected to the first rotating shaft 104 through the first transmission part 103. An output end of the first rotating shaft 104 is connected to the support frame for driving the support frame to rotate. In one example, the first driving mechanism 101 takes the form of a worm gear and a worm reducer motor. Here, the first transmission part 103 and the first rotating shaft 104 operate as a worm wheel and worm gear, The worm gear is provide with the first rotating shaft 104, the first transmission part 103 section rotates the first rotating shaft 104 by means of the worm gear and worm principle. The motor's driving force is transmitted through this worm gear and worm reducer arrangement, providing torque amplification. Additionally, the inherent self-locking function of the worm gear and worm wheel helps prevent motor damage.

In some aspects, the light stand base 100 includes a control box 105, and the support frame is equipped with an installation base 400 on the outside. The installation base has a first limiting guide rail 401 on the side facing the control box 105, while the control box is equipped with a first limiting post 106 that fits into the first limiting guide rail 401. The first driving mechanism 101 is installed in the control box 105 with an output end connected to the installation base 400 to drive the installation base 400 to rotate relative to the control box 105.

Figure 4:
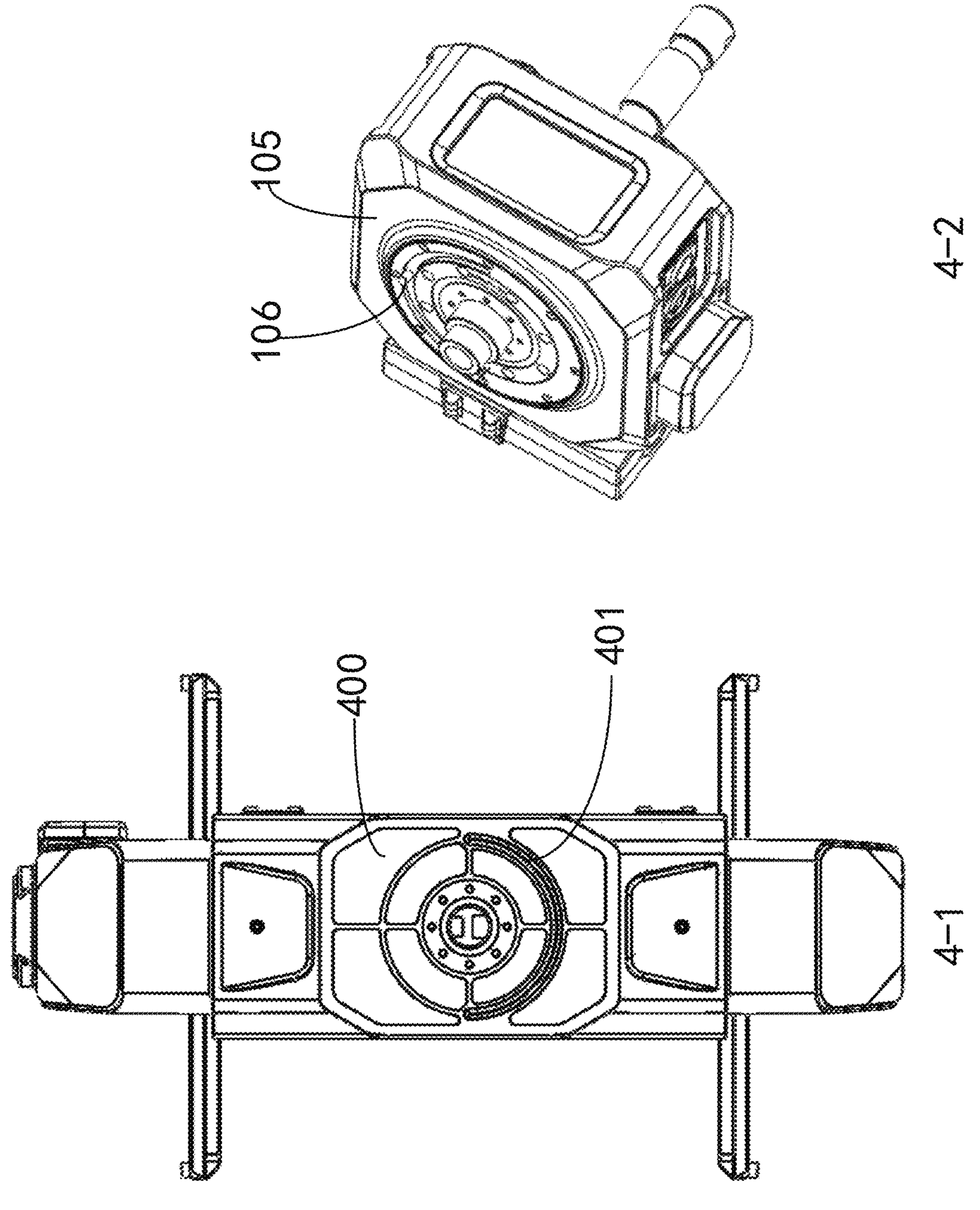
FIG. 4 is a diagram depicting a base and a light stand base of a light stand according to some aspects of the disclosure.

Turning to FIGS. 1 and 4, FIG. 4 depicts the installation base 400 (FIG. 4-1) and the light stand base 100 (FIG. 4-2)

of the light stand according to some aspects. The light stand base 100 incorporates a control box 105, which acts as its outer shell. The support frame is furnished with an installation base 400 that not only stabilizes the support frame but also articulates with the output end of the first driving mechanism 101 of the light stand base 100. This allows the output end of the first driving mechanism 101 to rotate the installation base 400, subsequently rotating the support frame. The installation base 400 has a first limiting guide rail 401 on the side facing the control box 105, while the control box 105 is equipped with a first limiting post 106 that fits into the first limiting guide rail 401. The interaction between the first limiting guide rail 401 and the first limiting post 106 ensures that the mounting base 400 rotates within a predetermined angle.

In some aspects, the light stand further includes a second driving mechanism 202. One end of the support frame away from the light stand base 100 includes an installation portion 201 for mounting the light source component. The second driving mechanism 202 is mounted on the installation portion 201 to drive the light source component to rotate relative to the installation portion 201.

Figure 5:
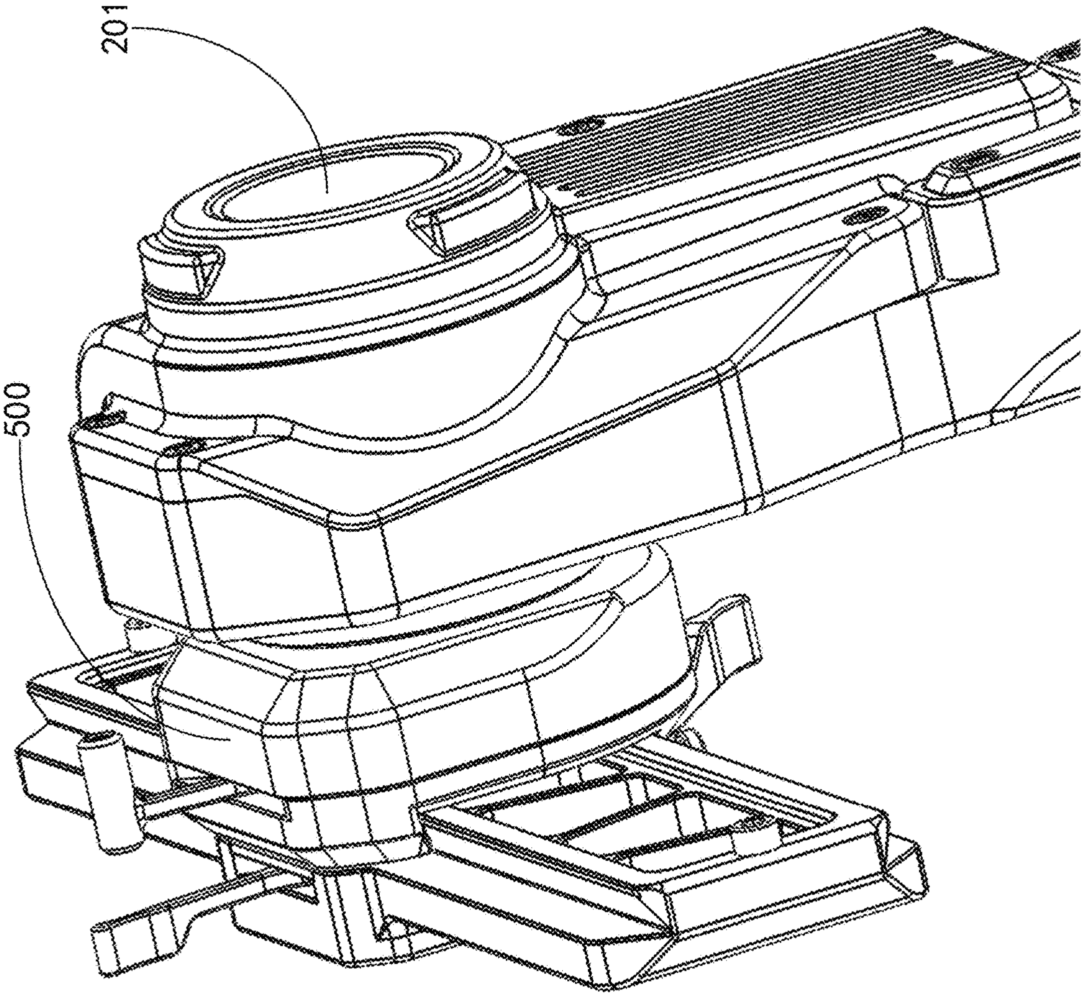
FIG. 5 is a diagram depicting an installation portion of a light stand according to some aspects of the disclosure.
Figure 6:
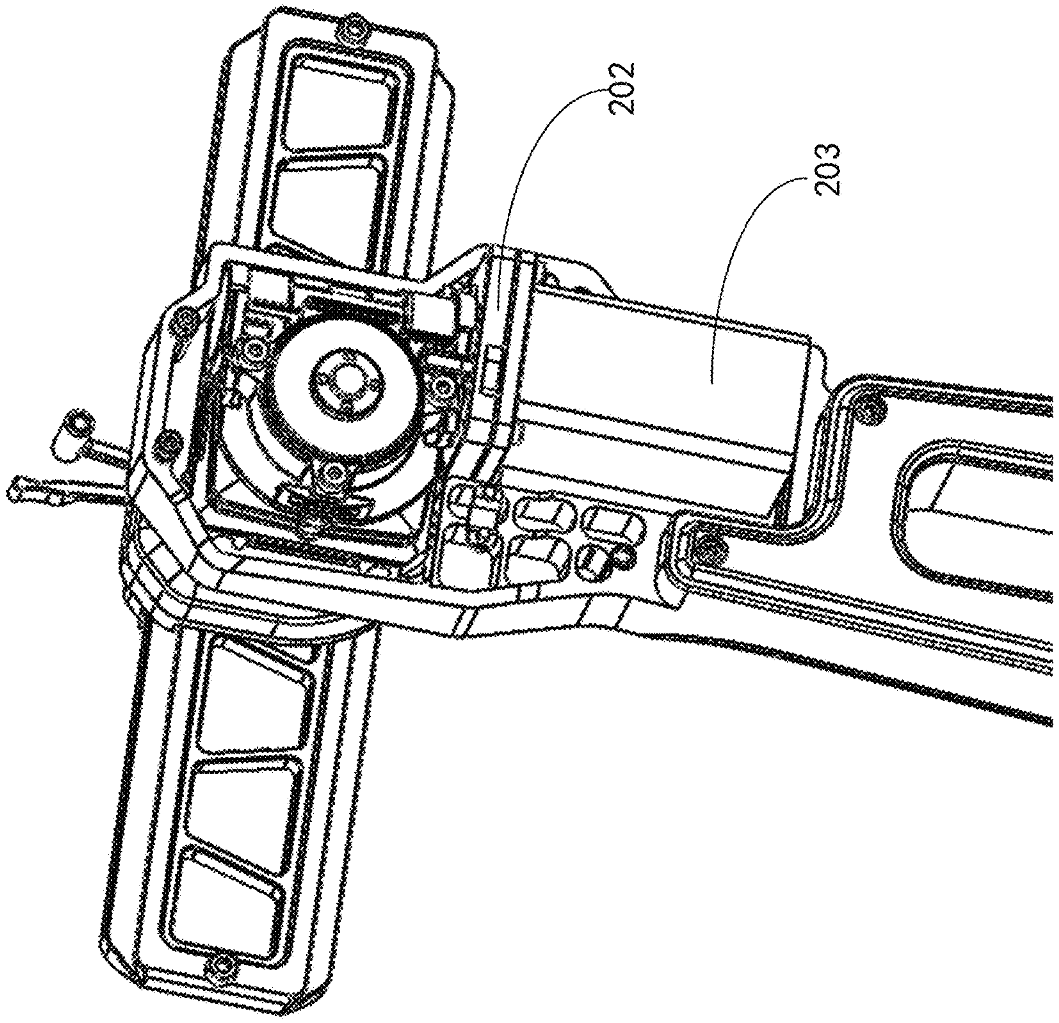
FIG. 6 is a diagram depicting an internal structural of a light stand revealing the inside of a second driving mechanism according to some aspects of the disclosure.

Referring to FIGS. 1, 5, 6, and 9, FIG. 5 depicts the structure of the installation portion 201 of the light stand in one embodiment, and FIG. 6 reveals the internal structure of the second driving mechanism 202 with the shell of the mounting portion 201 removed. The second driving mechanism 202 is installed at the end of the first support frame 200 where the light source is mounted. In some aspects, the second driving mechanism 202 can be placed on either the first support frame 200, the second support frame 300, or any additional support frames, and it can also be mounted on multiple support frames simultaneously. The end of the support frame opposite the light stand base 100 features an installation portion 201 for securing the light source. The second driving mechanism 202, mounted on this portion, is designed to rotate the light source relative to the installation portion 201.

In some aspects, the support frame includes a first support frame 200 and a second support frame 300 connected to each other. An output end of the first driving mechanism 101 is connected to a junction of the first and second support frames 200 and 300. Both the first and second support frames 200 and 300 have installation portions 201 for mounting the light source component at their ends away from the light stand base. The second driving mechanism is mounted on the installation portion 201 of the first support frame 200 to drive the light source component to rotate relative to the installation portions 201 of both the first and second support frames 200 and 300.

Referring back at FIG. 1, the support frame includes a first support frame 200 and a second support frame 300, which are joined at their bases by the installation base 400.

In some aspects, the light stand further includes a rotating base 500 (FIG. 6) which is movably connected to the installation portion of the support frame for mounting the light source component. An output end of the second driving mechanism 202 is connected to the rotating base 500 to drive the rotating base 500 to rotate relative to the support frame.

Referring to FIGS. 5 and 6, the light stand includes a rotating base 500. The side of the rotating base 500 proximate to the support frame is articulately connected to the installation portion 201 of the support frame, while the opposing side accommodates the light source. The output end of the second driving mechanism 202 interfaces with the rotating base 500, facilitating its rotation relative to the support frame. This rotation subsequently drives the light source to rotate relative to the support frame, adjusting its illumination angle.

Figure 9:
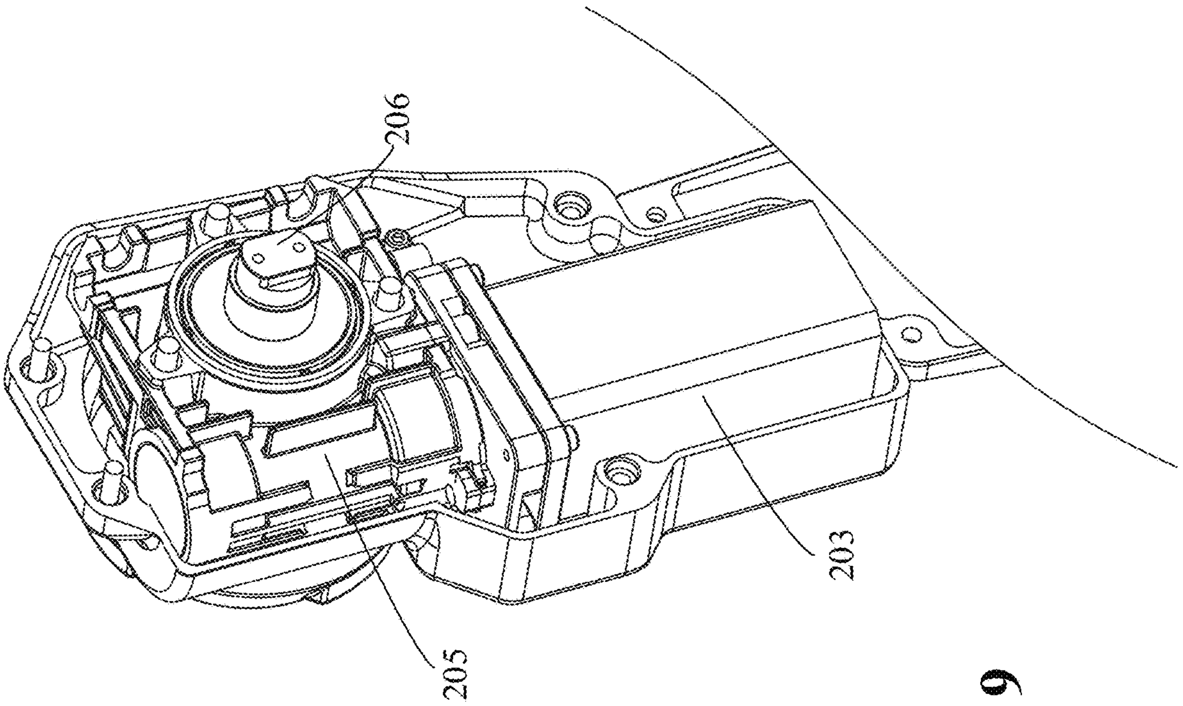
FIG. 9 is a diagram depicting a second driving mechanism with a shell removed according to some aspects of the disclosure.

In some aspects, referring to FIG. 9, the second driving mechanism 202 includes a second driving motor 203, a second transmission part 205, and a second rotating shaft 206. The second driving motor 203 is fixedly mounted on the installation portion and connected to the second rotating shaft 206 through the second transmission part 205. An output end of the second rotating shaft 206 is connected to the rotating base 500 to drive the light source to rotate relative to the installation portion.

Turning to FIGS. 3, 5, 6, and 9, the second driving mechanism 202 includes a second driving motor 203, a second transmission part 205, and a second rotating shaft 206. The second driving motor 203 is securely affixed to the installation portion 201 and linked to the second rotating shaft 206 via the second transmission part 205. Notably, the second driving mechanism 202 operates as a worm gear and worm reducer motor, wherein the second transmission part 205 and the second rotating shaft 206 function as a worm gear and worm, The worm gear is provided with the second rotating shaft 206, the second transmission part 205 section rotates the second rotating shaft 206 by means of the worm gear and worm principle. FIG. 9 depicts a detailed connection schematic between the second rotating shaft 206 and the second transmission part 205. Both the second rotating shaft 206 and the output end of the second transmission part 205 engage the rotating base 500, inducing its rotation relative to the installation portion 201. This, in turn, causes the light source to rotate, adjusting its illumination angle. The employment of the second driving mechanism 202, via the second rotating shaft 206 and the second transmission part 205, augments the motor's output torque through the high reduction ratio due to the worm gear and worm wheel mechanism. Additionally, this mechanism exhibits a self-locking capability, preventing dropping of the rotating base 500 affected by the gravity-induced dropping of the light source.

In some aspects, the light stand further includes a quick-release assembly 600 and a first locking component 502. The rotating base 500 has a first mounting groove 501 on a side facing away from the support frame. A first side of the quick-release assembly 600 can be mounted on the first mounting groove 501 and locked by the first locking component 502, while a second side is used for mounting the light source component.

Figure 7:
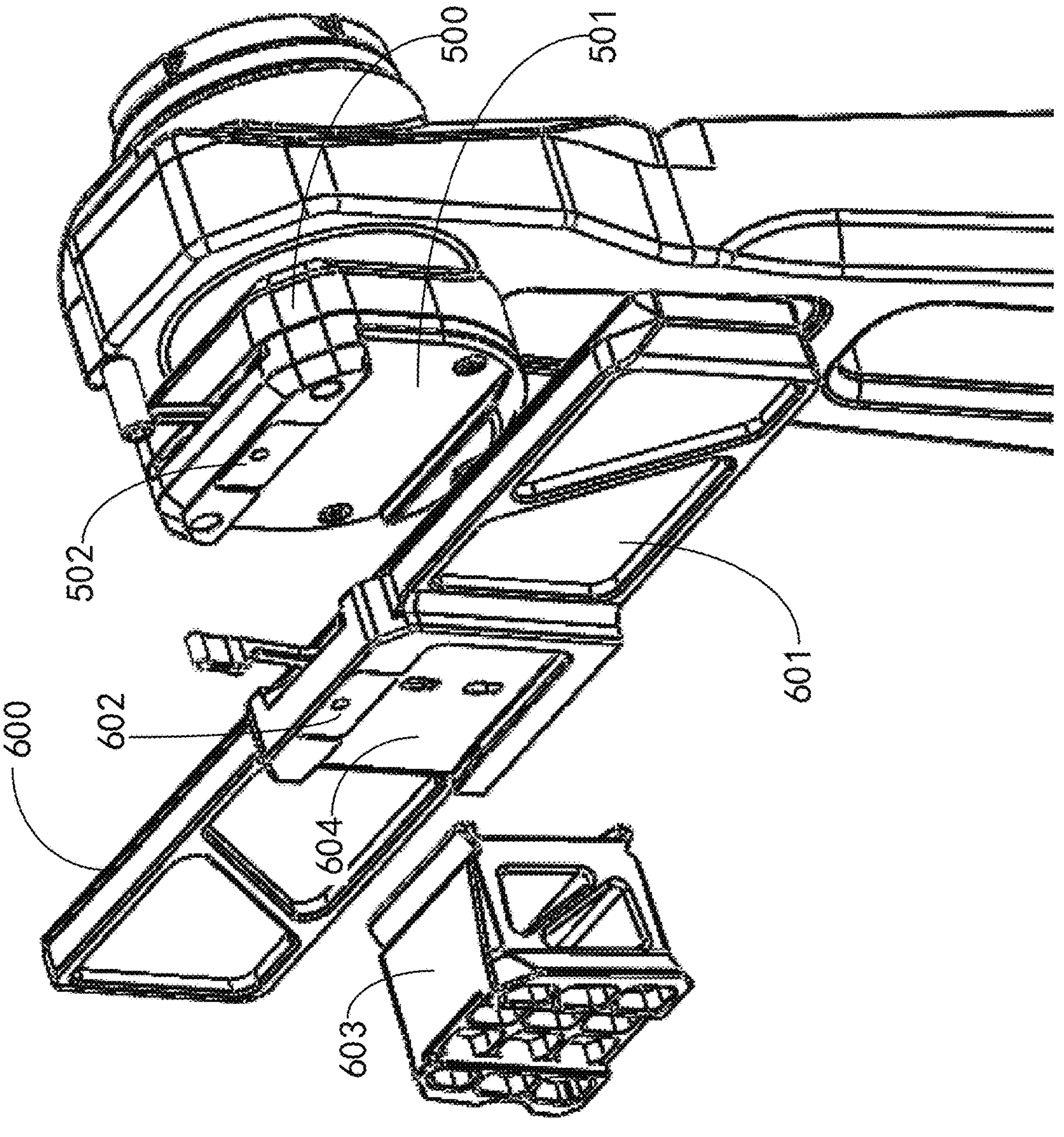
FIG. 7 is an exploded view of a quick-release component of the light stand according to some aspect of the disclosure.

FIG. 7 depicts an exploded view of the quick-release assembly of the light stand. The light stand further includes a quick-release assembly 600 and a first locking component 502. The rotating base 500 has a first mounting groove 501 on a side facing away from the support frame. A first side of the quick-release assembly 600 can be mounted on the first mounting groove 501 and locked by the first locking component 502, while a second side is used for mounting the light source component.

In some aspects, the quick-release assembly 600 includes a quick-release piece 601, a second locking component 602, and an installation block 603. The quick-release piece 601 has a quick-mounting plate on a first side for mounting in the first mounting groove 501 and a second mounting groove 604 on a second side. A first side of the installation block 603 can be mounted on the second mounting groove 604 and locked by the second locking component 602, while a second side is used for mounting the light source component.

Referring to FIG. 7, the quick-release assembly 600 includes a quick-release piece 601, a second locking component 602, and an installation block 603. The quick-release piece 601 has a quick-mounting plate on a first side for mounting in the first mounting groove 501, as the quick-mounting plate, positioned on the side of the quick-release component 601 closest to the rotating base 500, mates with the first mounting groove 501 according to FIG. 7, and a second mounting groove 604 on a second side. A first side of the installation block 603 can be mounted on the second mounting groove 604 and locked by the second locking component 602, while a second side is used for mounting the light source component. FIG. 7 also depicts levers aligned with the first locking component 502 and the second locking component 602. These levers are mechanically linked to the clamping plates within the locking components. By manipulating these levers, the clamping plates can be disengaged and reset. When the clamping plates are reset, the corresponding components are securely fastened.

In some aspects, the rotating base 500 and the support frame are equipped with a second limiting guide rail 204 and a second limiting post 503, respectively. The second limiting guide rail 204 and the second limiting post 503 cooperate for limiting the rotation of the rotating base.

Figure 8:
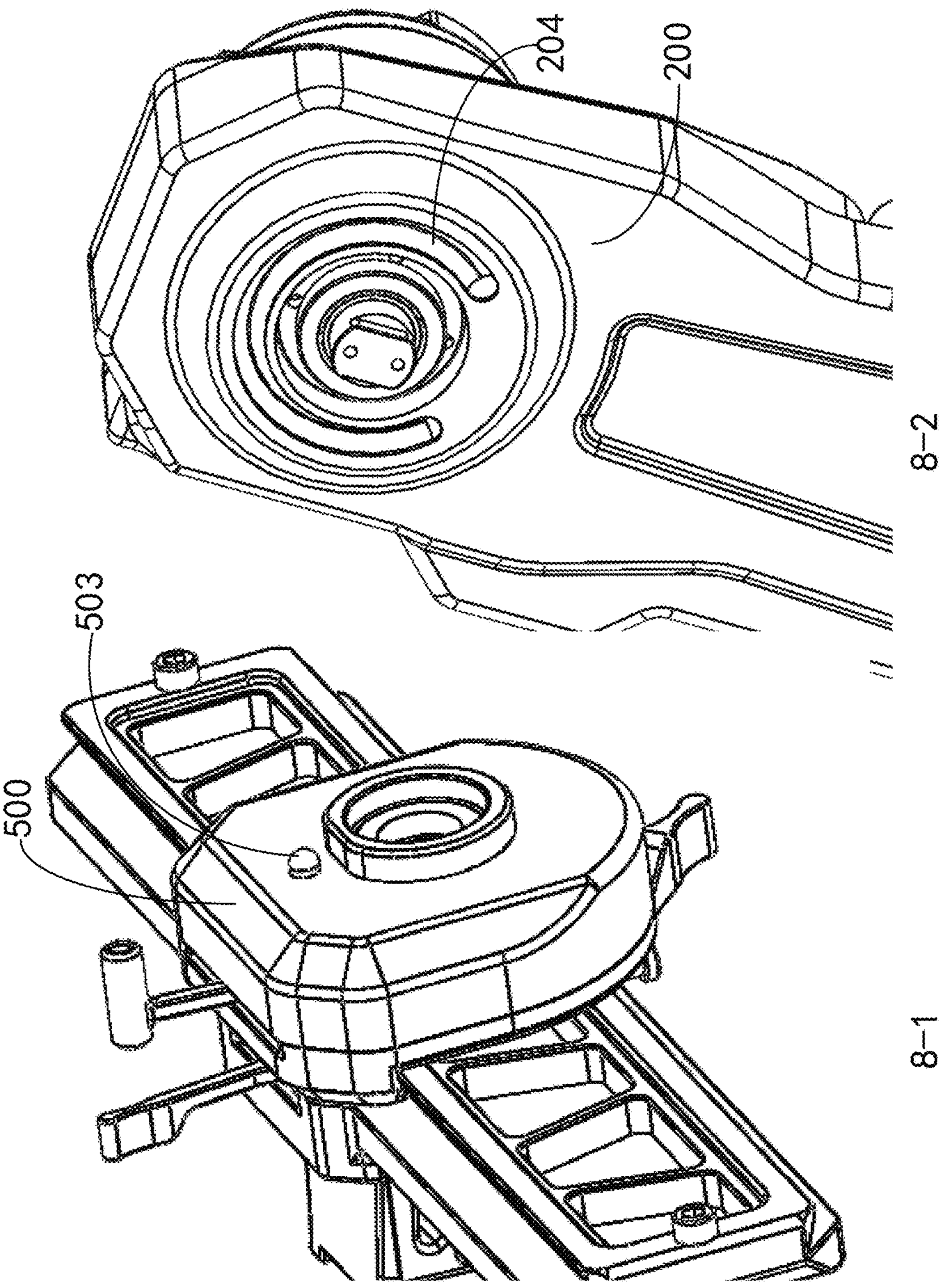
FIG. 8 is a diagram depicting a rotating base and a second support frame of a light stand according to some aspects of the disclosure.

FIG. 8 depicts the rotating base 500 (FIG. 8-1) and the second support frame 200 (FIG. 8-2) of the light stand according to some aspects of the disclosure. The side of the rotating base 500 adjacent to the second support frame 200 features a second limiting post 503. Correspondingly, the side of the second support frame 200 nearest to the rotating base 500 sports a second limiting guide rail 204. The cooperation of the second limiting guide rail 204 and the second limiting post 503 ensures controlled rotation of the rotating base 500, thereby preventing excessive rotation and potential collisions with the support frame.

The examples provided above serve to illustrate this invention for a better understanding and are not intended to limit its scope. Technicians in the field can derive several deductions, modifications, or substitutions based on the core principles of this invention.

What is claimed is:

1. A light stand, comprising:

a light stand base equipped with a first driving mechanism; and a support frame for mounting a light source component on the light stand, one end of the support frame away from the light stand base comprising an installation portion for mounting the light source component, and the installation portion being movably provided with a rotating base for mounting the light source component, wherein an output end of the first driving mechanism is connected to a bottom of the support frame, enabling the first driving mechanism to drive the support frame to rotate relative to the light stand base, wherein the rotating base comprises a quick-release assembly and a first locking component, wherein the rotating base further comprises a first mounting groove on a side facing away from the support frame, and wherein a first side of the quick-release assembly is configured to be mounted on the first mounting groove and locked by the first locking component, and a second side of the quick-release assembly is configured for mounting the light source component.

2. The light stand according to claim 1, wherein the first driving mechanism comprises a first driving motor, a first transmission part, and a first rotating shaft;

the first driving motor is fixedly mounted on the light stand base and connected to the first rotating shaft through the first transmission part; and an output end of the first rotating shaft is connected to the support frame for driving the support frame to rotate.

3. The light stand according to claim 1, wherein the light stand base comprises a control box, and the support frame comprises an installation base;

the installation base has a first limiting guide rail on a side facing the control box, while the control box is equipped with a first limiting post that fits into the first limiting guide rail; and the first driving mechanism is installed in the control box with an output end connected to the installation base to drive the installation base to rotate relative to the control box.

4. The light stand according to claim 1, wherein the light stand further comprises a second driving mechanism; and the second driving mechanism is mounted on the installation portion for driving the light source component to rotate relative to the installation portion.

5. The light stand according to claim 4, wherein the support frame comprises a first support frame and a second support frame connected to each other;

an output end of the first driving mechanism is connected to a junction between the first support frame and the second support frame;

the installation portion comprises a first installation portion at an end of the first support frame and a second installation portion at an end of the second support frame for mounting the light source component at the respective ends of the first support frame and the second support frame away from the light stand base; and the second driving mechanism is mounted on the installation portion of the first support frame for driving the light source component to rotate relative to the first installation portion of the first support frame and the second installation portion of the second support frame.

6. The light stand according to claim 4, wherein an output end of the second driving mechanism is connected to the rotating base to drive the rotating base to rotate relative to the support frame.

7. The light stand according to claim 6, wherein the second driving mechanism comprises a second driving motor, a second transmission part, and a second rotating shaft;

the second driving motor is fixedly mounted on the installation portion and connected to the second rotating shaft through the second transmission part; and an output end of the second rotating shaft is connected to the rotating base for driving the light source component to rotate relative to the installation portion.

8. The light stand according to claim 1, wherein the quick-release assembly comprises a quick-release piece, a second locking component, and an installation block;

the quick-release piece comprises a quick-mounting plate on a first side for mounting in the first mounting groove and a second mounting groove on the second side; and a first side of the installation block is mounted on the second mounting groove and locked by the second locking component, and the second side is configured for mounting the light source component.

9. The light stand according to claim 6, wherein the rotating base comprises a second limiting post, and the support frame comprises a second limiting guide rail; and the second limiting guide rail and the second limiting post cooperate to limit a rotation of the rotating base.

* * * * *